US006609375B2

(12) United States Patent
Allen et al.

(10) Patent No.: US 6,609,375 B2
(45) Date of Patent: Aug. 26, 2003

(54) AIR COOLING SYSTEM FOR ELECTRIC ASSISTED TURBOCHARGER

(75) Inventors: John Allen, Torrance, CA (US); Gerhard Delf, Santa Barbara, CA (US); Kevin Birch, Santa Barbara, CA (US); Daniel Black, Santa Barbara, CA (US); Rhett Hedrick, Santa Barbara, CA (US); Len Wedman, Santa Barbara, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/952,449

(22) Filed: Sep. 14, 2001

(65) Prior Publication Data

US 2003/0051475 A1 Mar. 20, 2003

(Under 37 CFR 1.47)

(51) Int. Cl.[7] .................................................. F02B 33/44
(52) U.S. Cl. .......................................... 60/608; 60/607
(58) Field of Search ............................ 60/608, 607, 597

(56) References Cited

U.S. PATENT DOCUMENTS

| 4,689,960 A | * | 9/1987 | Schroder et al. ............. 60/607 |
| 4,745,755 A | * | 5/1988 | Kawamura ................... 60/608 |
| 4,774,811 A |   | 10/1988 | Kawamura |
| 4,884,406 A |   | 12/1989 | Kawamura |
| 5,605,045 A |   | 2/1997 | Halimi et al. |
| 5,904,471 A |   | 5/1999 | Woollenweber et al. |
| 5,906,098 A | * | 5/1999 | Woollenweber et al. ...... 60/608 |
| 6,305,169 B1 | * | 10/2001 | Mallof ........................ 60/608 |

FOREIGN PATENT DOCUMENTS

| DE | 19518317 A1 | 5/1995 |
| JP | 58138223 | 8/1983 |
| JP | 7071262 | 3/1995 |

* cited by examiner

Primary Examiner—Thomas Denion
Assistant Examiner—Thai-Ba Trieu
(74) Attorney, Agent, or Firm—Ephraim Starr

(57) ABSTRACT

A system for controlling the temperature of an electric motor in an electric assisted turbocharger that is coupled to an internal combustion engine has a turbocharger with an electric motor disposed within a motor housing. The motor housing has a motor housing inlet and a motor housing outlet. The turbocharger has a compressor with a compressor inlet and a compressor outlet. The turbocharger also has a turbine. A first cooling hose is coupled to the compressor outlet and coupled to the motor housing inlet. A second cooling hose is coupled to the motor housing outlet and coupled to the compressor inlet.

4 Claims, 5 Drawing Sheets

AIR COOLING SYSTEM FOR ELECTRIC ASSISTED TURBOCHARGER

This invention relates generally to the field of turbochargers and, more particularly, to an air cooling system for controlling the temperature of an electric motor disposed within an electric assisted turbocharger.

BACKGROUND OF THE INVENTION

Turbochargers for gasoline and diesel internal combustion engines are devices known in the art that are used for pressurizing or boosting the intake air stream, routed to a combustion chamber of the engine, by using the heat and volumetric flow of exhaust gas exiting the engine. Specifically, the exhaust gas exiting the engine is routed into a turbine housing of a turbocharger in a manner that causes an exhaust gas-driven turbine to spin within the housing. The exhaust gas-driven turbine is mounted onto one end of a shaft that is common to a radial air compressor mounted onto an opposite end of that shaft. Thus, rotary action of the turbine also causes the air compressor to spin within a compressor housing of the turbocharger that is separate from the exhaust housing. The spinning action of the air compressor causes intake air to enter the compressor housing and be pressurized or boosted a desired amount before it is mixed with fuel and combusted within the engine combustion chamber.

Because the rotary action of the turbine is dependent upon the heat and volumetric flow of exhaust gas exiting the engine, turbochargers are often of reduced effectiveness when the engine to which they are coupled is run at a low speed. The reduced effectiveness is often labeled turbo-lag. In order to overcome turbo-lag when the heat and volumetric flow of exhaust gas is low, turbochargers have been constructed that make use of an electric motor disposed therein to assist shaft rotation and to induce the compressor to spin.

The operating conditions found within an electric assisted turbocharger may produce temperatures high enough to cause motor overheating. Motor overheating may damage the stator of the electric motor, and may permanently de-magnetize the rotor of the electric motor. Additionally, electric assisted turbochargers are especially susceptible to entering compressor surge regimes, because such electric control of the compressor can enable the compressor to function in a manner that is relatively independent of engine operating conditions.

Generally speaking, compressor surge is a turbocharger condition whereby pressurized air created by the compressor meets an internal system resistance, oftentimes causing the pressurized air to be forced backwards through the turbocharger. Surge can occur from different turbocharger operating conditions, and is known to occur during engine operating conditions of deceleration. Compressor surge is generally an undesirable condition that can cause several problems from noise to component failure that can be detrimental to turbocharger and engine life and performance.

It is, therefore, desirable that an electric assisted turbocharger be constructed in a manner that minimizes potential electric motor problems due to high operating temperatures. It is also desired that such an electric assisted turbocharger be configured in a manner that minimizes and/or eliminates the a surge condition from occurring. It is desired that any such electric assisted turbocharger be constructed to provide such benefits in a manner that does not detrimentally impact desired turbocharger performance.

SUMMARY OF THE INVENTION

The present invention is for a system for controlling the temperature of an electric motor in an electric assisted turbocharger that is coupled to an internal combustion engine. The system has a turbocharger with an electric motor disposed within a motor housing. The motor housing has a motor housing airflow inlet and a motor housing airflow outlet. The turbocharger has a compressor with a compressor airflow inlet and a compressor airflow outlet. The turbocharger also has a turbine disposed within a turbine housing. Pressurized air taken downstream from the from the compressor outlet is routed to the motor housing airflow inlet for providing cooling air to the electric motor. Cooling air is removed from the electric motor via the motor housing airflow outlet, and is routed to the compressor inlet.

In an additional embodiment of the present invention, the system has a variable orifice fitting positioned adjacent the motor housing outlet for controlling an amount of air that passes through the motor housing outlet. A suitable actuator is coupled to the variable orifice fitting for operating the orifice. The system also has an electric motor controller electrically coupled to the electric motor and electrically coupled to the actuator. The electric motor controller controls the operation of the electric motor and the operation of the electric actuator, to both govern the speed of the electric motor and the amount of cooling air directed thereto for purposes of controlling electric motor temperature.

A motor temperature sensor is electrically coupled to the electric motor controller. The motor temperature sensor senses a temperature of the electric motor, and the electric motor controller controls the variable orifice fitting based upon signals received from the motor temperature sensor. Thus, the variable orifice fitting allows adequate cooling to prevent the motor from overheating, and also prevents too much air from being taken from the compressor output, which may have a negative impact on engine performance.

In an additional embodiment utilizing a variable orifice fitting and an electric actuator, an engine speed sensor is electrically coupled to the electric motor controller for sensing a rotational speed of the internal combustion engine. Additionally, a turbocharger speed sensor is coupled to the electric motor controller for sensing a rotation speed of the turbocharger shaft. A memory is electrically coupled to the electric motor controller. The memory has a multi-dimensional map stored therein of surge conditions correlating to the speed of the internal combustion engine and to the speed of the turbocharger. The electric motor controller is configured to control the electric actuator and the variable orifice fitting, based upon signals from the engine speed sensor and from the turbocharger speed sensor in view of the multi-dimensional map of surge conditions stored in the memory, in a manner avoiding surge.

In yet an additional embodiment utilizing a variable orifice fitting and an electronic actuator, an intake air sensor is electrically coupled to the electric motor controller. The intake air sensor senses a volume of air entering the turbocharger. A pressure ratio sensor is also electrically coupled to the electric motor controller. The pressure sensor senses a compressor pressure ratio. A memory is electrically coupled to the electric motor controller. The memory has a multi-dimensional map stored therein of surge conditions correlating to the speed of the internal combustion engine and to the speed of the turbocharger. The electric motor controller is configured to control the electronic actuator and the variable orifice fitting, based upon signals from the intake air sensor and from the pressure ratio sensor in view of the multi-dimensional map of surge conditions stored in the memory, in a manner avoiding surge.

BRIEF DESCRIPTION OF THE DRAWINGS

The aspects of the present invention are more readily understood when considered in conjunction with the accompanying drawings and the following detailed description wherein.

DETAILED DESCRIPTION

Electric assisted turbochargers of this invention comprise an electric motor disposed within a motor housing that is configured to receive pressurized air downstream of the compressor for purposes of cooling the electric motor and, thereby preventing potential electric motor overheating. Additionally, electric assisted turbochargers of this invention are configured having a control means for regulating the amount of cooling air directed to the electric motor, thereby both enabling control over electric motor operating temperature, and enabling avoidance of compressor surge by reducing the amount of compressor backpressure.

Figure 1:
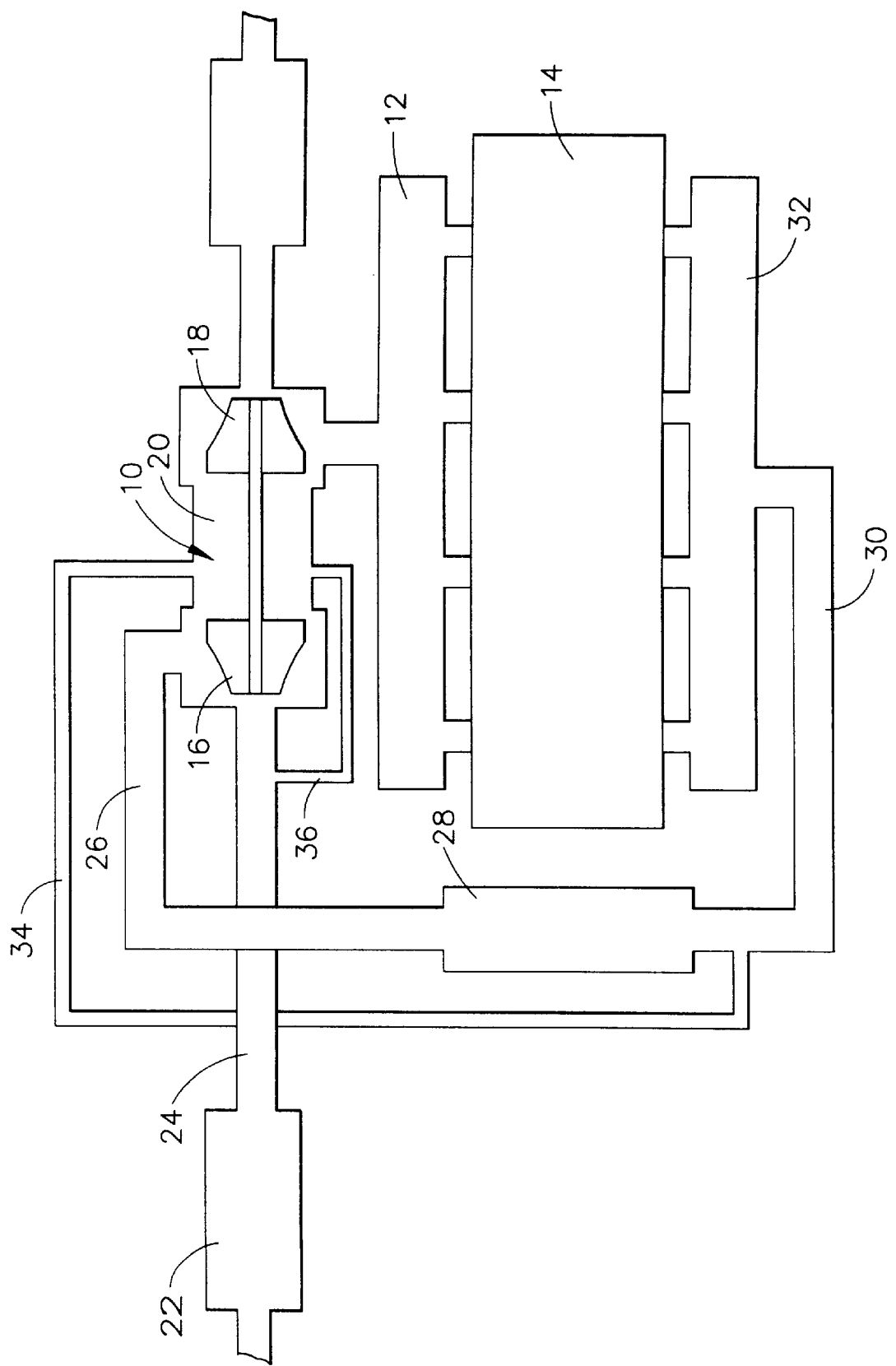
FIG. 1 is a cross-sectional view of a turbocharger and engine system according to an embodiment of the present invention.

As shown in FIG. 1, an electric assisted turbocharger 10 is mounted adjacent to an exhaust manifold 12 of an internal combustion engine 14. The electric assisted turbocharger 10 comprises a compressor 16 and a turbine 18. Exhaust gas passing out of the exhaust manifold 12 spins the turbine 18. Between the compressor 16 and the turbine 18 is a motor housing 20.

The compressor 16 is connected at its inlet to an air filter 22 via a first air hose 24. The air leaves the compressor 16 via its outlet under increased pressure through a second air hose 26. The pressurized air produced by the compressor is passed through an intercooler 28, where the air is cooled. Once the air passes through the intercooler 28, the air is directed, via a third air hose 30, to the intake manifold 32 which supplies the air to the internal combustion engine 14.

In an embodiment of the present invention, pressurized air produced by the compressor 16 is directed, via a first cooling hose 34, to the motor housing 20 of the electric assisted turbocharger 10. The air passes through the motor housing 20 and out through a second cooling hose 36, which directs the air back to the compressor inlet via the first air hose 24. In an additional embodiment of the present invention, the first cooling hose 34 is connected between the third air hose 30 and the motor housing 20, so that air entering the first cooling hose 34 will have already passed through the intercooler. In yet another embodiment, the first cooling hose 34 routes air from upstream of the compressor and routes the air into the motor cavity 20. In an additional embodiment, air is bled from an area of the compressor, such as the back of a compressor wheel, or from an area within the compressor scroll, into the motor housing 20.

Figure 2:
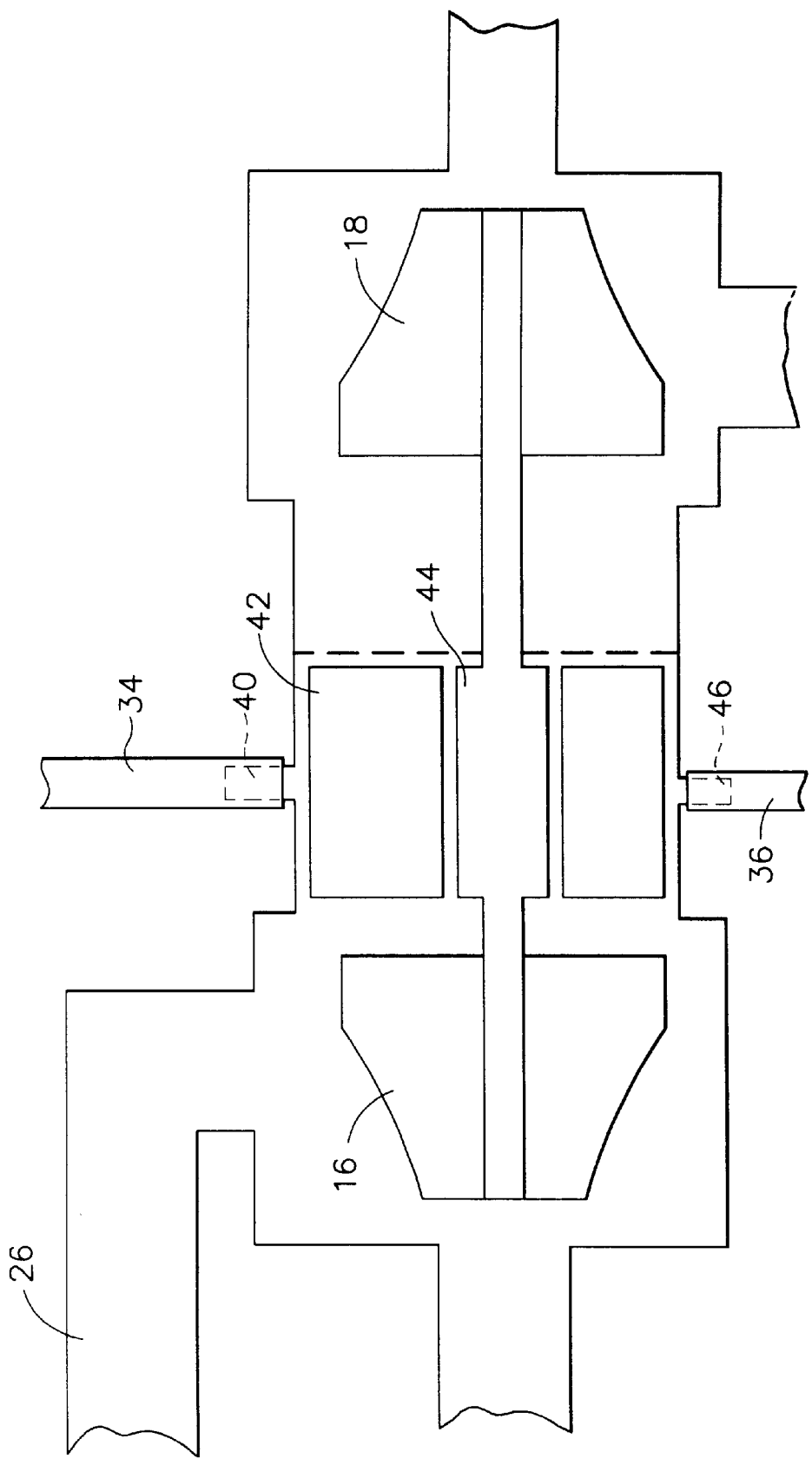
FIG. 2 is a cross-sectional view of a turbocharger according to an embodiment of the present invention.

Considering the path of the air through the motor housing in more detail, as shown in FIG. 2, the air enters the motor housing from the first cooling hose 34 through a motor housing airflow inlet 40. The air travels across the stator 42 and rotor 44 of the electric motor, and passes through a motor housing airflow outlet 46 located on an opposite circumferential end from the motor housing airflow inlet 40.

A pressure gradient is created with the pressurized air passing from the compressor through the first cooling hose 34, through the motor housing 20, and back to the first air hose 24, which is an area of lower pressure. The pressure gradient keeps the air flowing through the motor housing 20.

In an embodiment of the present invention, the motor housing inlet 40 and the motor housing outlet 46 are configured to maintain a positive pressure in the motor housing 20. The inlet and outlet are an appropriate size to sufficiently cool the motor without detrimentally affecting the stream of air charged by the compressor directed to the intake manifold 32.

Figure 3:
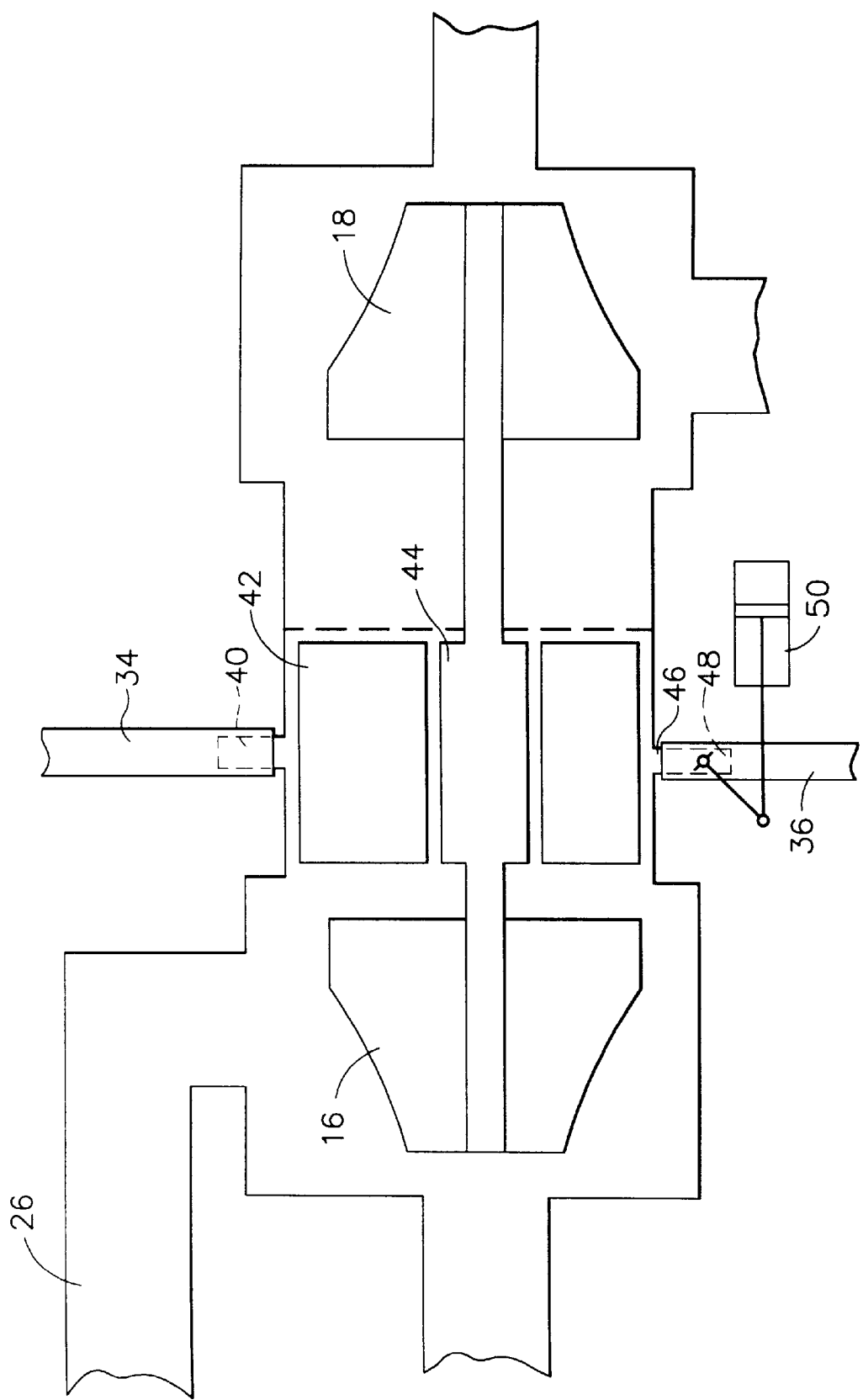
FIG. 3 is a cross-sectional view of a turbocharger having an actuator controlling a variable orifice fitting of a motor housing according to an embodiment of the present invention.
Figure 4:
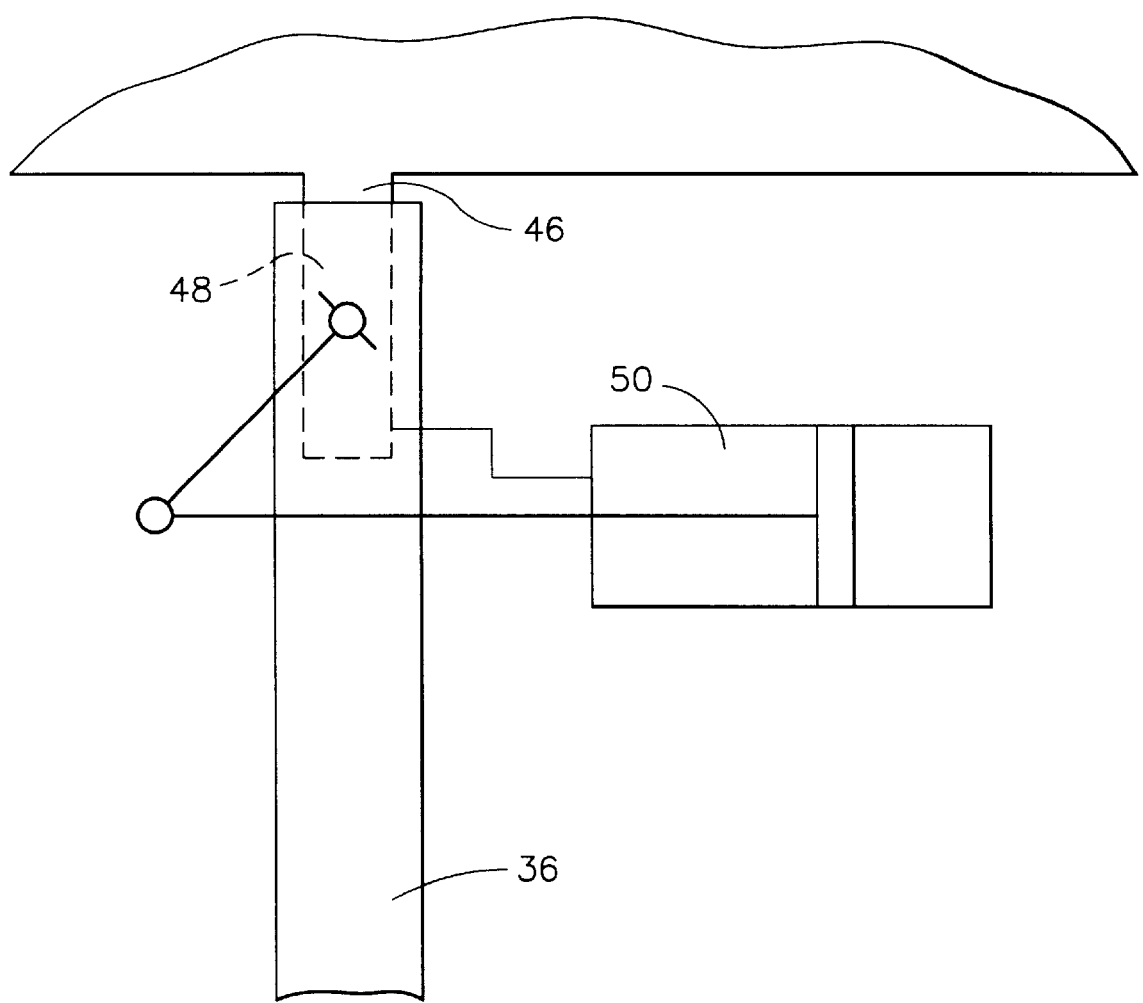
FIG. 4 is a second cross-sectional view of a turbocharger having an actuator controlling the variable orifice fitting of a motor housing according to an embodiment of the present invention.

In an additional embodiment, shown in FIGS. 3 and 4, in order to allow adequate cooling of the electric motor, without diverting too much charge air away from the internal combustion engine, the pressure gradient is controlled with airflow control means. In an example embodiment, such airflow control means is a variable orifice fitting 48 that is positioned in airflow communication with the air being directed through the motor housing. In an example embodiment, the variable orifice fitting is positioned at the electric motor airflow outlet 46. The variable orifice fitting is controlled by an electric actuator 50. A temperature sensor (not shown), in electric communication with either an engine Electronic Control Unit (ECU), or an electric motor controller, is placed next to the stator of the electric motor. The ECU or the electric motor controller manipulates the variable orifice fitting through the actuator, based upon the sensed temperature of the electric motor stator, to ensure optimal cooling air flow.

In yet another embodiment, the variable orifice fitting is used to prevent and remedy a surge condition. An electric motor controller is coupled to a plurality of sensors (not shown). The sensors are configured to monitor a number of different engine and/or turbocharger operating conditions/parameters. In an embodiment of the present invention, the sensors are configured to assess, for example: (1) engine speed in revolutions per minute (RPM); (2) engine load; (3) intake air flow; (4) turbocharger operating pressures before and after the compressor; and (5) turbocharger speed in revolutions per minute (RPM).

The electric motor controller is configured to have the capability to store and read multi-dimensional maps containing information about the surge states of a particular compressor in relation to a plurality of ascertainable engine and compressor characteristics. The electric motor controller uses the multidimensional maps in conjunction with the conditions sensed by the sensors to alter the variable opening fitting 48 using the actuator 50, as the compressor approaches, or enters, a surge state. Generally speaking, if a surge state is detected it is desired that the actuator be operated in a manner the opens the size of the variable opening fitting to thereby decrease the pressure level of boost air downstream from the compressor, and increase the rate of cooling airflow to the electric motor.

A first embodiment of the present invention utilizing a variable orifice fitting to prevent a surge condition, comprises a sensor that is configured to monitor engine speed and a sensor that is configured to monitor turbocharger speed. A multi-dimensional map is created that correlates engine speed and turbocharger speed to surge conditions for the particular electric assisted turbocharger being controlled, i.e., plotting possible surge regimes for the specific compressor and engine design.

Figure 5:
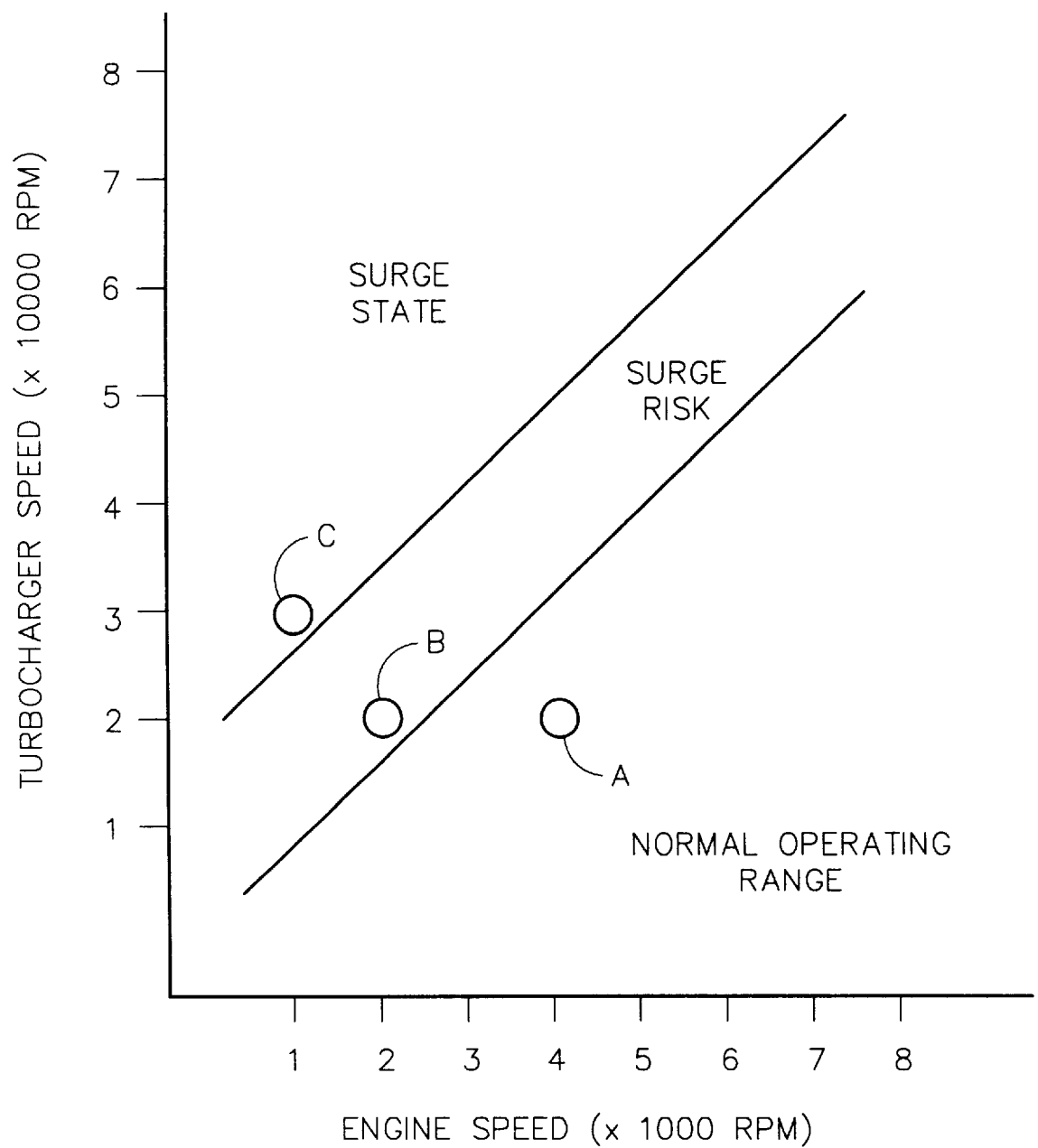
FIG. 5 is a graph that represents a multi-dimensional map of surge states as a function of engine speed (x-axis) and turbocharger speed (y-axis).

Referring now to FIG. 5, such a map is divided into three different regions; namely, a first region of normal operating range, a second region of surge risk, and a third region of surge state. The multi-dimensional map of FIG. 5 represents the three such regions for a hypothetical turbocharger and engine system, and is provided for purposes of reference. It is to be understood that the three regions will occupy different locations on such plot depending on the particular application and turbocharger design characteristics, i.e., compressor design.

The map is stored in a memory accessed by the electric motor controller. Each time the engine speed and the turbocharger speed are communicated to the electric motor controller, the electric motor controller plots the engine speed and the turbocharger speed on the stored multi-dimensional map.

If the plot taken from the provided sensor information indicates that the turbocharger is operating in a normal operating range, then the variable orifice fitting is not altered based upon the threat of a surge state. An example scenario where a turbocharger is operating in the normal range is where the engine is operating at a speed of approximately 4,000 revolutions per minute, and the turbocharger is operating at a speed of approximately 20,000 revolutions per minute. When plotted onto the map shown in FIG. 5, those operating conditions yield the location indicated at point A, which is in the normal operating range portion of the map.

However, if the plot taken from the sensor information indicates that there is a surge risk, then the motor controller operates the actuator which in turn operates the variable orifice fitting to prevent a surge condition. An example scenario where there is a surge risk is where the engine is operating at a speed of 2,000 revolutions per minute and the turbocharger is operating at a speed of 20,000 revolutions per minute. When plotted onto the map shown in FIG. 5, such operating conditions yield the location indicated at point B, which is in a surge risk portion of the map.

If the plot taken from the sensor information indicates that a surge state has been entered, the motor controller operates the actuator, which in turn opens the variable orifice, to stop a surge condition. By opening the variable orifice, more compressed air flows through the motor housing and back into the compressor air inlet stream, thus bypassing the intake manifold of the engine. An example scenario where a surge state has been reached is where the engine is operating at a speed of approximately 1,000 revolutions per minute and the turbocharger is operating at a speed of 30,000 revolutions per minute. When plotted onto the map shown in FIG. 5, such operating conditions yield the plot indicated at point C, which is in a surge portion of the map.

The map in FIG. 5 is illustrative of a two-dimensional map with three different compressor operating states. In additional embodiments of the present invention, the map can divided into more than three states, with each state having a different course of action. Additionally, the map can be based on more than two different engine and/or turbocharger performance parameters.

In a second embodiment utilizing a variable orifice fitting to prevent a surge condition, an air flow sensor senses the air flow to the compressor. Additionally, the pressure ratio across the compressor is monitored. In this alternative embodiment, the multi-dimensional map contains information specific to a compressor.

The surge information is stored in a multi-dimensional map as a function of intake air flow and compressor pressure ratio. Each time the air flow and the compressor pressure ratio are communicated to the electric motor controller, the electric motor controller plots the air flow and the compressor pressure ratio on the stored multi-dimensional map. As with the example embodiment provided above (for engine speed and turbocharger speed), if the plot indicates that a surge state is not present or approaching then the actuator, and the variable orifice fitting, is not manipulated to prevent a surge condition. However, if the plot indicates that a surge condition is approaching or is occurring, the electric motor controller powers the actuator to open the variable orifice fitting to allow more charged air to be bled away from the intake manifold and returned to the low pressure compressor intake air stream.

Having now described the invention in detail as required by the patent statutes, those skilled in the art will recognize modifications and substitutions to the specific embodiments disclosed herein. Such modifications are within the scope and intent of the present invention.

What is claimed is:

1. A system for controlling the temperature of an electric motor in an electric assisted turbocharger that is coupled to an internal combustion engine comprising:
   a turbocharger having:
     an electric motor disposed within a motor housing, the motor housing having a motor housing airflow inlet and a motor housing airflow outlet;
     a compressor, the compressor having a compressor inlet and a compressor outlet; and
     a turbine interconnected to drive the compressor;
   a first cooling hose coupled to the compressor outlet and coupled to the motor housing airflow inlet; and
   a second cooling hose coupled to the motor housing airflow outlet and coupled to the compressor inlet.

2. A system for controlling the temperature of an electric motor in an electric assisted turbocharger that is coupled to an internal combustion engine as defined in claim 1 further comprising:
   a variable orifice fitting controlling an amount of air that passes through the motor housing airflow outlet;
   an electric actuator controlling the variable orifice fitting;
   an electric motor controller electrically coupled to the electric motor and electrically coupled to the electric actuator, the electric motor controller controlling the operation of the electric motor and controlling operation of the electric actuator; and
   a motor temperature sensor electrically coupled to the motor controller, the motor temperature sensor sensing a temperature of the electric motor wherein the electric motor controller is configured to control the electric actuator based upon signals from the motor temperature sensor.

3. A system for controlling the temperature of an electric motor in an electric assisted turbocharger that is coupled to an internal combustion engine as defined in claim 1 further comprising:
   a variable orifice fitting controlling an amount of air that passes through the motor housing airflow outlet;
   an electric actuator controlling the variable orifice fitting;

an electric motor controller electrically coupled to the electric motor and electrically coupled to the electric actuator, the electric motor controller controlling the operation of the electric motor and controlling operation of the electric actuator;

an engine speed sensor electrically coupled to the electric motor controller, the engine speed sensor sensing a rotational speed of the internal combustion engine;

a turbocharger speed sensor coupled to the electric motor controller, the turbocharger speed sensor sensing a rotation speed of the turbocharger shaft; and a memory electrically coupled to the electric motor controller, the memory having a multi-dimensional map stored therein of surge conditions correlating to the speed of the internal combustion engine and to the speed of the turbocharger wherein the electric motor controller is configured to control the electric actuator based upon signals from the engine speed sensor and from the turbocharger speed sensor in view of the multi-dimensional map of surge conditions stored in the memory.

4. A system for controlling the temperature of an electric motor in an electric assisted turbocharger that is coupled to an internal combustion engine as defined in claim 1 further comprising:

a variable orifice fitting controlling an amount of air that passes through the motor housing airflow outlet;

an electric actuator controlling the variable orifice fitting;

an electric motor controller electrically coupled to the electric motor and electrically coupled to the electric actuator, the electric motor controller controlling the operation of the electric motor and controlling the operation of the electric actuator;

an intake air sensor electrically coupled to the electric motor controller, the intake air sensor sensing a volume of air entering the turbocharger;

a pressure ratio sensor coupled to the electric motor controller, the pressure ratio sensor sensing a compressor pressure ratio; and a memory electrically coupled to the electric motor controller, the memory having a multi-dimensional map stored therein of surge conditions correlating to the speed of the internal combustion engine and to the speed of the turbocharger wherein the electric motor controller is configured to control the electric actuator based upon signals from the intake air sensor and from the pressure ratio sensor in view of the multi-dimensional map of surge conditions stored in the memory.

* * * * *